US007158689B2

(12) United States Patent
Valleriano et al.

(10) Patent No.: US 7,158,689 B2
(45) Date of Patent: Jan. 2, 2007

(54) CORRELATING CAPTURED IMAGES AND TIMED EVENT DATA

(75) Inventors: Michael A. Valleriano, Webster, NY (US); Christopher I. Marshall, Pittsford, NY (US); Mark A. Bobb, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 812 days.

(21) Appl. No.: 10/303,363

(22) Filed: Nov. 25, 2002

(65) Prior Publication Data

US 2004/0100566 A1   May 27, 2004

(51) Int. Cl.
*G06K 9/64* (2006.01)
*G06K 9/32* (2006.01)
*G06K 9/60* (2006.01)

(52) U.S. Cl. .................. 382/278; 382/294
(58) Field of Classification Search .............. 382/278, 382/300, 294; 707/102, 2; 348/169, 231.5
See application file for complete search history.

(56) References Cited

U.S. PATENT DOCUMENTS

| | | | | |
|---|---|---|---|---|
| 6,377,995 B1 * | 4/2002 | Agraharam et al. | ........ | 709/231 |
| 6,441,846 B1 * | 8/2002 | Carlbom et al. | ............ | 348/169 |
| 6,631,522 B1 * | 10/2003 | Erdelyi | ........................ | 725/53 |
| 6,662,176 B1 * | 12/2003 | Brunet et al. | ................... | 707/2 |
| 6,795,638 B1 * | 9/2004 | Skelley, Jr. | ................... | 386/52 |
| 6,877,010 B1 * | 4/2005 | Smith-Semedo et al. | ... | 707/102 |
| 6,950,989 B1 * | 9/2005 | Rosenzweig et al. | ....... | 715/721 |
| 6,970,102 B1 * | 11/2005 | Ciolli | ......................... | 340/933 |
| 2002/0008622 A1 | 1/2002 | Weston et al. | ........... | 340/572.1 |
| 2002/0101519 A1 | 8/2002 | Myers | ........................ | 348/232 |
| 2003/0103149 A1* | 6/2003 | Kinjo et al. | ............. | 348/231.5 |

OTHER PUBLICATIONS

U.S. Appl. No. 10/273,871, filed Oct. 21, 2002, Michael Valleriano et al.
http://www.championchip.com/company/.
http://64.84.58.116/runners_races/winning_time.html.

* cited by examiner

*Primary Examiner*—Andrew W. Johns
*Assistant Examiner*—Amir Alavi
(74) *Attorney, Agent, or Firm*—Stephen H. Shaw

(57) ABSTRACT

A method for correlating asynchronously captured event data associated with a timed activity and images associated with the events comprises the steps of: (a) capturing a plurality of images and storing the images and data corresponding to the images, including a time of image capture for each image, in an image database; (b) gathering data from one or more events associated with the timed activity and storing event data, including a time of occurrence of each event, in an event database; and (c) correlating the images and the event data in the databases by generating a time-based window that interrelates event data in the event database having a time of occurrence within the window with images in the image database having a time of capture within the window.

21 Claims, 16 Drawing Sheets

| CAMERA DATA | | | |
|---|---|---|---|
| LOCATION | A | A | B |
| IMAGE ID | 1447 | 1448 | 2789 |
| CAPTURE TIME | 1:14:27.11 | 1:14:29.32 | 2:34:33.50 |
| CONTESTANT ID | 125,437 | 125,437 | 620, 344, 1128 |

FIG. 16

| RACE DATA | | | |
|---|---|---|---|
| TAG ID | 12 | 147 | 388 |
| LOCATION A | 0:01:09.11 | 0:00:53.10 | 0:02:29.05 |
| LOCATION B | 1:14:22.35 | 1:56:16.37 | 1:08:59.50 |
| LOCATION Z | 2:51:37.52 | 2:31:02.30 | 3:02:11.19 |

FIG. 18A

| CAMERA DATA | | | | |
|---|---|---|---|---|
| LOCATION | A | B | C | Z |
| DISTANCE | 0.00 | 16.50 | 20.10 | 26.52 |
| IMAGE ID | 1447 | 2789 | 5187 | 7453 |
| CAPTURE TIME | 1:14:27.11 | 2:34:33.50 | | 3:42:20.34 |
| CONTESTANT ID | 125, 437 | 620, 344, 1128 | 101, 168, 1452 | 16, 551 |

FIG. 18B

CORRELATING CAPTURED IMAGES AND TIMED EVENT DATA

CROSS-REFERENCE TO RELATED APPLICATION(S)

Reference is made to copending application Ser. No. 10/273,871, entitled "Correlating Asynchronously Captured Event Data and Images" and filed Oct. 18, 2002 in the names of M. Valleriano, C. Marshall and M. A. Bobb, which is assigned to the assignee of this application.

FIELD OF THE INVENTION

The invention relates generally to the field of digital image processing, and in particular to the automatic correlation of images with objects in the images or events associated with the images.

BACKGROUND OF THE INVENTION

There are a number of ways to identify a particular person within an image, picture or photo. One typical method provides the person with an identification number, and that identification number is then associated with an image. A few examples of such methods include magnetic stripe cards, bar codes, and radio frequency identification tags that are encoded with the person's identification number. The person's identification number is read before, during or after the image capture and the identification number is associated with the specific image by known methods (e.g., encoding the identification number in the image's metadata or recording the identification information in a database).

Eastman Kodak Co. has a number of products that associate a particular person with an image. For example, Kodak EPX Thrill Shots and Roving Photos, Kodak Image Magic Fantasy Theater and other Kodak products provide the subject with an identification (ID) tag that is associated with an image and used to find the image in an image database and produce a photographic product.

U.S. Patent Application Publication No. US2002/0008622 A1, which was published Jan. 24, 2002, describes a method of associating a particular person with one or more images using a radio frequency identification (RFID) tag. The tags are worn by park patrons during their visit to a park or other entertainment facility. Various readers distributed throughout the park or entertainment facility are able to read the RFID tags and reference unique identifier numbers. Thus, the unique identifier numbers can be conveniently read and provided to an associated photo/video capture system for purposes of providing indexing of captured images according to the unique identifiers of all individuals standing within the field of view of the camera. Captured photo images can thus be selectively retrieved and organized into a convenient photo/video album to provide a photo record of a family's or group's adventures at the park or other entertainment facility.

U.S. Patent Application Publication No. US2002/0101519 A1, which was published Aug. 1, 2002, describes a system such as might be used on a cruise line that more generically associates a person having a tag (e.g. RFID) with a captured image. The system uses a transponder that generates and transmits a unique identification code uniquely identifying the subject of the photographic image to a remote detection unit located within a digital camera. Upon receipt, the unique identification code is verified to correspond with the intended subject of a photographic image, and upon successful verification, the image is recorded. The transmitted unique identification code is encoded in the associated recorded image data, and the data is transferred to a computer-readable storage medium and stored in a database. Once stored, the image can be securely accessed and displayed via a user interface using the associated unique identification code.

The prior art works well for images when one or just a few people are in an image and when the identities of the people can be synchronized with the capture of the images, that is, when the identifier codes and the images are systematically captured together (synchronously) and stored together. However, these systems are not able to handle large numbers of people in a single image and are difficult to apply to multiple images with the same people in each of them. Just as important, these systems are difficult to apply in a situation where the identifier codes are not specifically tied to a particular image, that is, the identifier codes and the images are obtained by systems that are not necessarily synchronized (i.e., asynchronous).

This problem is illustrated with the example of a foot race. Races such as a marathon or ironman race typically have many contestants. Photographs of the contestants may be taken at the beginning of the race, at the finish line, or at any point along the race course. These photos may show a few people, but typically contain many people. Also, many photos may be taken throughout the race, and a given person could appear in a number of these photos. Similar situations occur at other events such as graduations, walks for charity, and so on.

At a race, the contestant initially registers by providing personal information that is stored in a registration database. The contestant is issued a Contestant ID number (CID) that is recorded in the registration database. The CID may also be provided on a bib, badge, pass or other article that the contestant can carry or wear. In the prior art, for example, the article could contain an RFID tag. These articles include the CID and may also include a unique tag article ID (TID) number. Information relating the CID and the TID is recorded in an article database (which could be different from the registration database).

For instance, in the implementation that will be described herein, the contestant is provided with a bib having a CID and an RFID tag with the TID; optionally, the RFID tag may also have the CID. It is possible for the RFID tag to be incorporated into the bib, or it might be a separate item such as a wrist or ankle band for wearing.

Data gathering stations are located at one or more points around the race course. Each data gathering station includes a means to read information from the RFID tag (or other article) as the contestant passes the station, and a way to associate that information with other data such as time, location, lap, etc. that is obtained from separate race timing apparatus. This information is stored in a race time database. The data gathering station may also include at least one camera that captures one or more images as the contestant races past the station. Ordinarily, the camera associates data such as time of capture, image number, camera number, etc., with the image in a camera image database. The challenge is to correlate the information from the various databases using the CID, TID, time, location and other data.

A method is needed to easily associate all the contestants within a given photo with that particular image, and also to easily locate all images that include a particular contestant. Such a method is particularly needed in a system where the data about the event, including the identities of the contestants, is asynchronously captured in relation to the images such that there is seldom a clear one-to-one relationship.

SUMMARY OF THE INVENTION

The present invention is directed to overcoming one or more of the problems set forth above. Briefly summarized, according to one aspect of the present invention, a method for correlating asynchronously captured event data associated with a timed activity and images associated with an event comprises the steps of: (a) capturing a plurality of images and storing the images and data corresponding to the images, including a time of image capture for each image, in an image database; (b) gathering data from one or more events associated with the timed activity and storing event data, including a time of occurrence of each event, in an event database; and (c) correlating the images and the event data in the databases by generating a time-based window that interrelates event data in the event database having a time of occurrence within the window with images in the image database having a time of capture within the window.

In another aspect of the invention, a system for capturing images and correlating asynchronously captured event data associated with a timed activity and images associated with an event comprises a camera system for capturing a plurality of images and recording data corresponding to the images, including a time of image capture for each image; an image database for storing the images and the data corresponding to the images; a data recording system for recording data from one or more events associated with the timed activity, including a time of occurrence of each event; an event database for storing the event data; and a processor for correlating the images and the event data in the databases by generating a time-based window that interrelates event data in the event database having a time of occurrence within the window with images in the image database having a time of capture within the window.

In one embodiment, the timed activity is a footrace and the events include the placement of one or more contestants in the captured images. The data associated with one or more events further includes identification of the contestants placed in the images and the step (c) of correlating the images with the event data includes relating the captured images with the identification of the contestants in the images.

The advantage of the invention lies in its ability to easily correlate asynchronously captured event data and images. As a result, in a race event it is possible to easily identify and associate all the contestants within a given photo with that particular image, and also to easily locate all images that include a particular contestant.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 16 shows a portion of the camera database useful in explaining image keyed correlation.

FIGS. 18A and 18B show portions of a camera database and a race database useful in understanding time interpolated correlation.

DETAILED DESCRIPTION OF THE INVENTION

Because image processing systems employing correlation and retrieval techniques are well known, the present description will be directed in particular to attributes forming part of, or cooperating more directly with, a method and system in accordance with the present invention. Method and system attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method and system as described according to the invention in the following materials, software not specifically shown, suggested or described herein that is useful for implementation of the invention is conventional and within the ordinary skill in such arts. If the invention is implemented as a computer program, the program may be stored in a conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
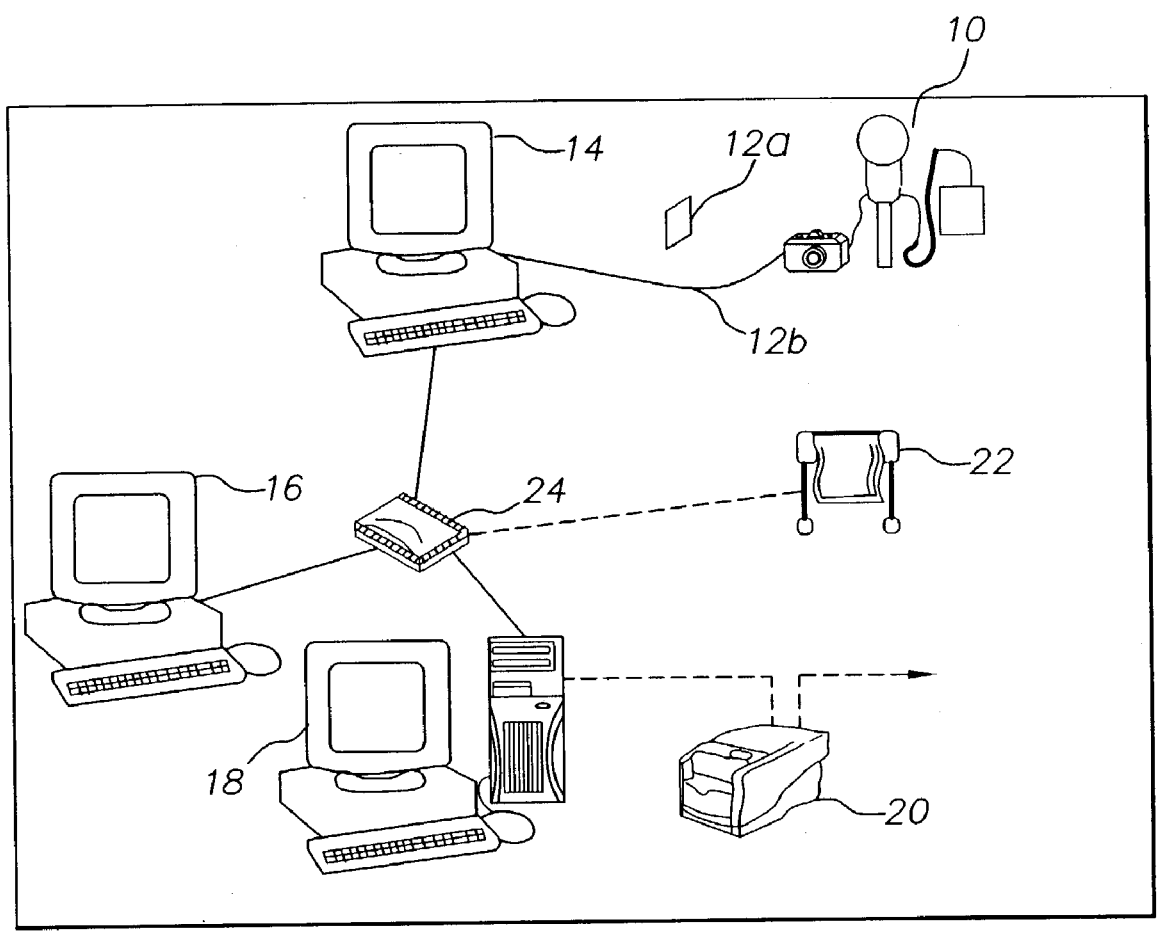
FIG. 1 is a pictorial diagram of a computer system for implementing the present invention.

Referring first to FIG. 1, there is illustrated a computer system for implementing the present invention. Although the computer system is shown for the purpose of illustrating a preferred embodiment, the present invention is not limited to the computer system shown, but may be used on any electronic processing system such as found in personal desktop or laptop computers or workstations, or any other system for the processing of digital images. The Kodak EPX system, a professional image operating system offered for the entertainment industry, serves as the basis for the photographic system used in this embodiment. This system includes one or more cameras 10 (which are preferably digital cameras capable of storing a considerable range of meta data (time, date, etc.) related to the captured images or Advanced Photo System (APS) cameras capable of recording a similar but usually lesser range of data on a magnetic region of its APS film). Images are captured by one or more of the cameras 10 and entered into the EPX system via removable storage media 12a (e.g., a Compact Flash card) or by a tethered link 12b between the camera 10 and a download computer 14. A point of consumer (POC) computer 16 is used to find, preview, edit and select images for output. Images selected for output are processed and print queues are managed by a print server 18 for output to a printer 20 or to a poster printer 22. Note that all of these computer functions are coordinated by a network switch 24, but could be implemented on a single computer, or any other number, or combination, of computers as required.

Additional computers (not shown) could be added to the system for additional functions. For example, a preview computer could be used to display images on preview monitors to entice contestants and other customers to the sales location. A dedicated operator computer could be provided for backroom operations. Other computer system architectures are possible, and many have been implemented in Kodak EPX installations.

Figure 2:
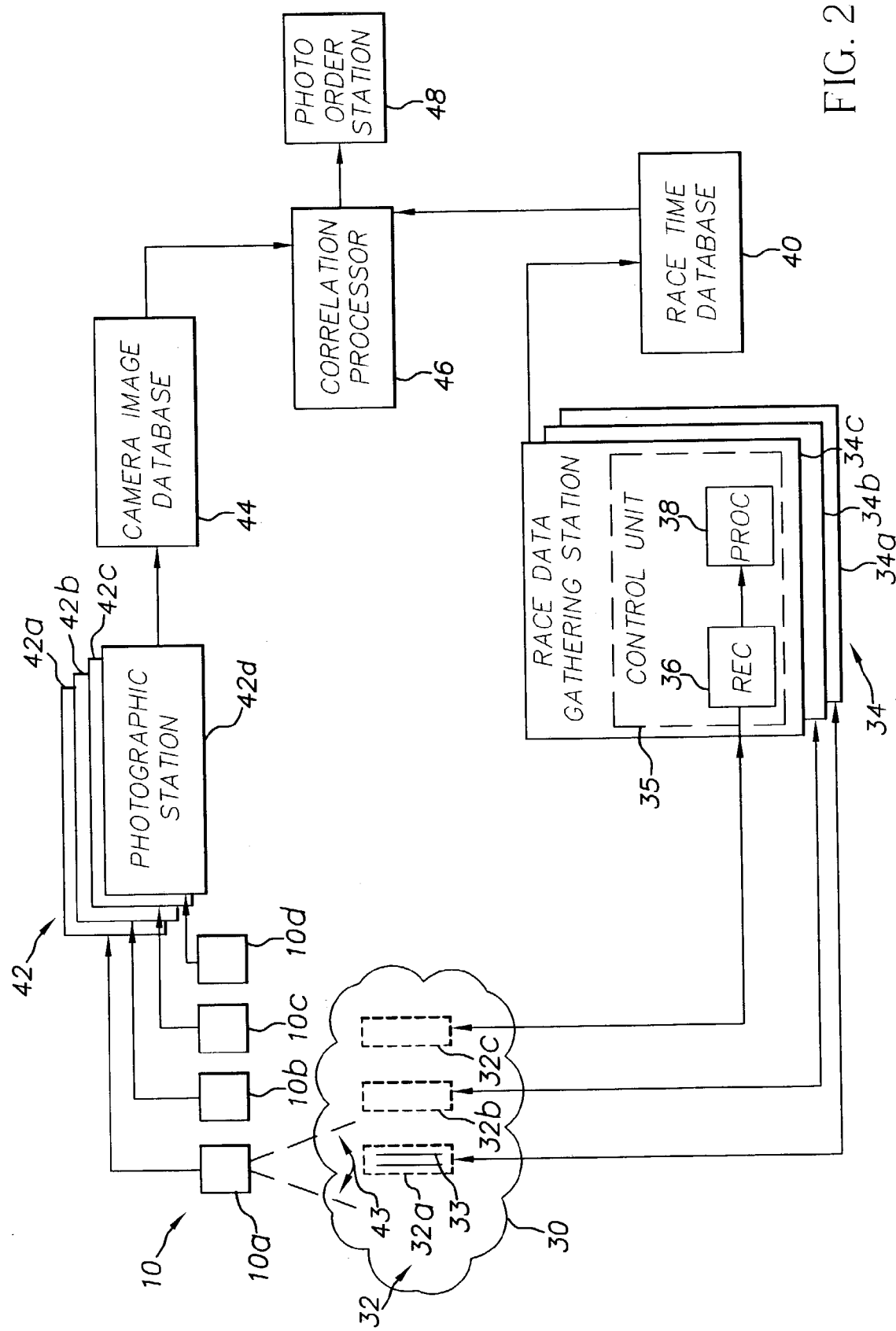
FIG. 2 is a block diagram of a system for capturing and correlating race event data and images according to the invention.

The general framework of a timed race scenario is shown as a block diagram in FIG. 2. In a preferred embodiment, a timed event 30 comprises a race course for a foot race, and includes one or more timing locations 32 for temporally registering the passage of race contestants. Each of the timing locations may include one or more pieces of race time measuring equipment 33, such as one or more timing mats, or any other form of conventionally available timing apparatus. Timing mat systems are available from such companies as Winning Time USA and ChampionChip Co., and are usually based on radio frequency identification (RFID) technology such as the TIRIS RFID technology developed by Texas Instruments. In a typical embodiment, these systems involve three components; an RF transponder chip worn by a contestant, e.g., as an ankle bracelet or on a bib, the timing mats, and control units connected to the timing mats. Antennas incorporated into the mats are driven by the control units to generate an electromagnetic field that energizes any transponder in their vicinity, e.g., of any contestant running over a mat. The transponder chip fastened to the contestant then powers up and sends its unique identification code back to the antennas in the nearby mats. The ID code is then passed in each mat through the antenna to its control unit, which records it together with the relevant time.

Accordingly, one or more race data gathering stations 34 are located at race timing points around the race course, and are connected to respective timing locations 32 for gathering timing data about the race contestants, e.g., a race data gathering station 34a is connected to a timing location 32a, a station 34b is connected to a location 32b, and so on. Each data gathering station 34 includes a control unit 35 connected to the race time measuring equipment; each control unit 35 includes a receiver 36 (which may be a transceiver) for reading information from an RFID tag (or other article) as the contestant passes the respective timing locations 32, and a local processor 38 for associating that information with other data such as time, location, lap, etc. originating from an internal clock, a lap counter, internally pre-stored location data, and the like. This information is stored in a race time database 40.

One or more photographic stations 42 are also located at photographic points around the race course. Preferably, some of these photographic points are nearby, or otherwise associated with, a timing location 32, and therefore associated with a race data gathering station 34, but other photographic points may stand alone on the race course unassociated with any particular timing location 32. Each photographic station includes one or more cameras 10; as shown in FIG. 2, cameras 10a, 10b and 10c are associated with timing locations 32a, 32b and 32c while a camera 10d is unassociated with any timing location. One or more images are captured as the contestants race past the cameras associated with each photographic station 42. In a typical situation, a photographer will manually trigger a camera to capture the pictures. However, the camera could be triggered via an automatic triggering system, such as a contestant breaking an infra-red (IR) beam arranged across the race path. Since, in a typical system, the timing mats trigger the RF transponder chip carried by the contestant to emit a signal picked up by the race time measuring equipment, this same signal could be used to trigger a control device associated with the camera to capture an image.

Each camera 10, as specifically shown for the camera 10a, has a field of view 43 that encompasses a particular timing location 32. Each photographic station 42 associates data such as time of capture, image number, camera number, etc., with the image in an camera image database 44. Data from the race timing database 40 and the camera image database are input to a correlation processor 46, where the information from the various databases is correlated using the CID, TID, time, location and other data. The correlated data is then input to a photo order station 48, where contestants may view and order images captured during the race.

FIG. 2 is presented herewith as an example of a typical scenario for the preferred embodiment. A number of variations would immediately come to mind for someone of ordinary skill in this type of endeavor. For instance, while one camera is shown as being associated with one photographic station, it is clear that two or more cameras may be included with any given photographic station. Also, a separate race time database 40 may be associated with each race data gathering station 34, or a common race time database may be provided for all, or a subset of, the race data gathering stations. Similarly, a separate camera image database 44 may be associated with each photographic station 42, or a common camera image database may be provided for all, or a subset of, the photographic stations. Separate databases may be provided for the registration information, the tagged article information and the race timing data, or they may be combined in one database, such as the race time database 40. It should also be clear that the timing locations 32 may each include two or more timing inputs from additional timing apparatus, such as from two or more timing mats. While not shown specifically in FIG. 2, the input to the receiver 36 would come from, e.g., an article worn by each race contestant, which would typically be activated whenever the contestant comes into range of the receiver 36 and/or an antenna connected to the receiver. Furthermore, the connections between the various components may be locally "hard wired" for the particular racing event, or the components may be networked over, e.g., a local area network. Some of the connections may be radio frequency, optical, etc. In another embodiment, the front end of the system, e.g., the stations 32 and 42 and the databases 40 and 44, may be locally connected, while the back end of the system, e.g., the processor 46 and the photo order station 48, may be accessible over a public network, such as the Internet.

Figure 3:
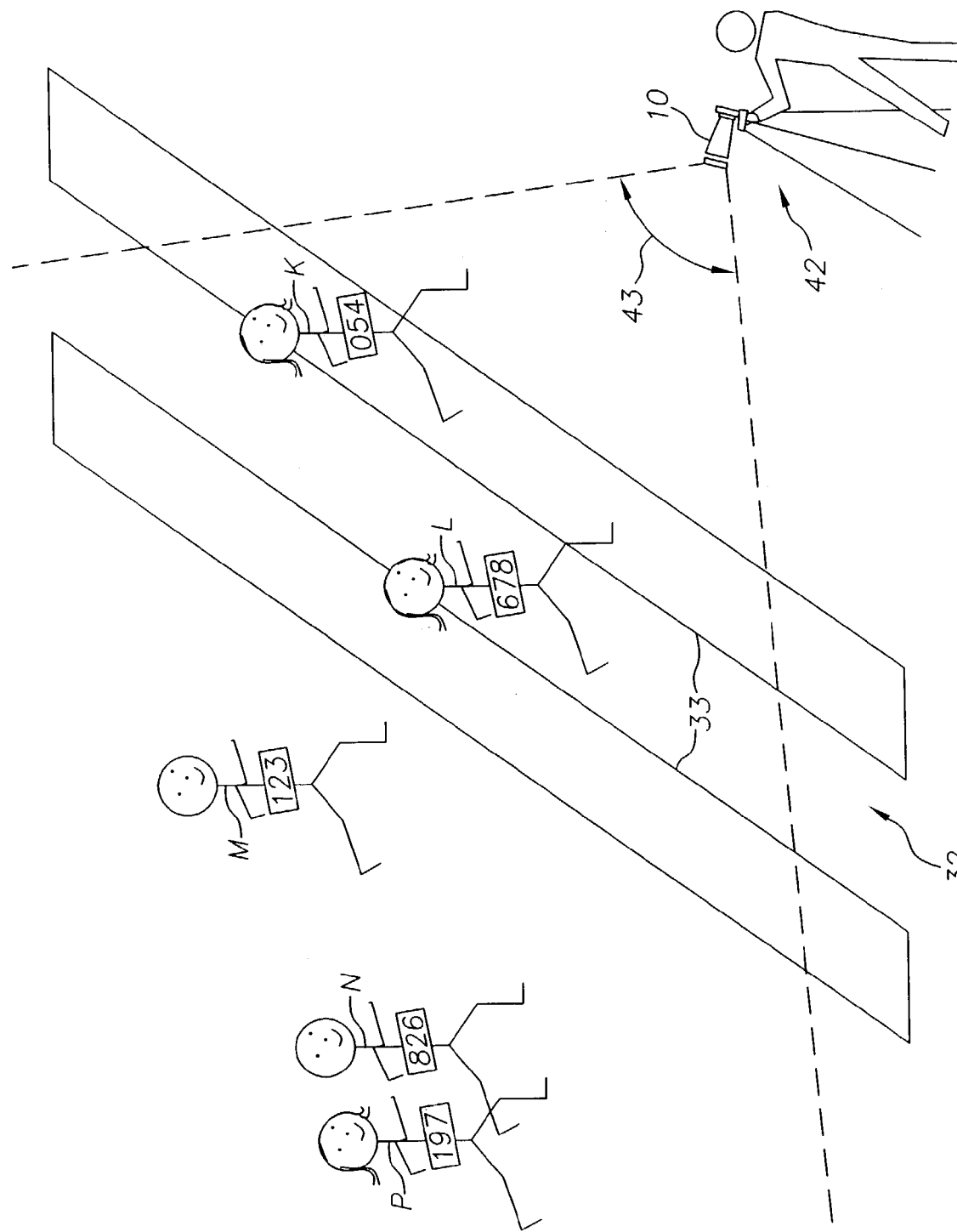
FIG. 3 is a pictorial illustration of a foot race, where the photographed contestant has not yet reached the timing mat.
Figure 4:
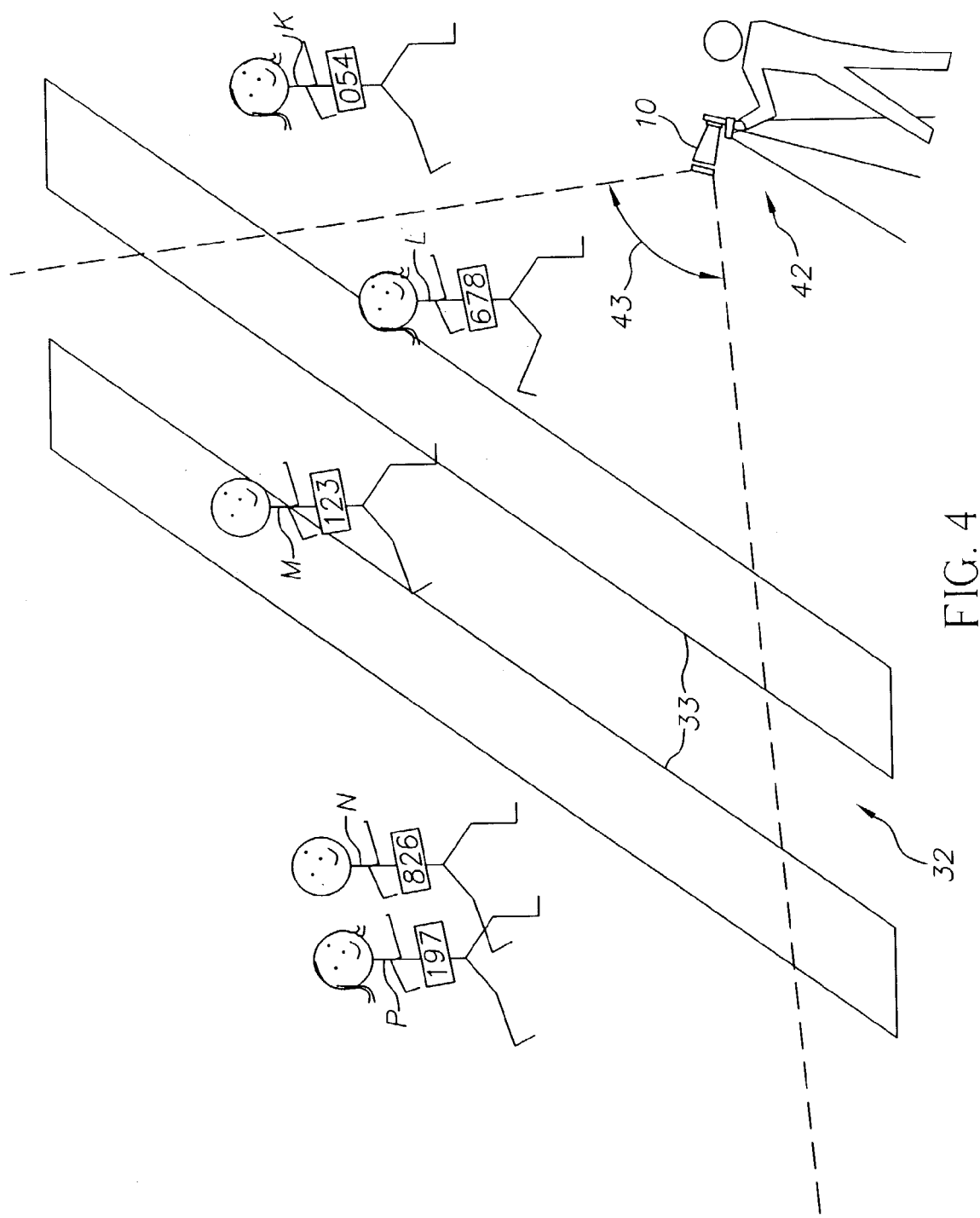
FIG. 4 is a pictorial illustration of a foot race, where the photographed contestant is passing the timing mat.
Figure 5:
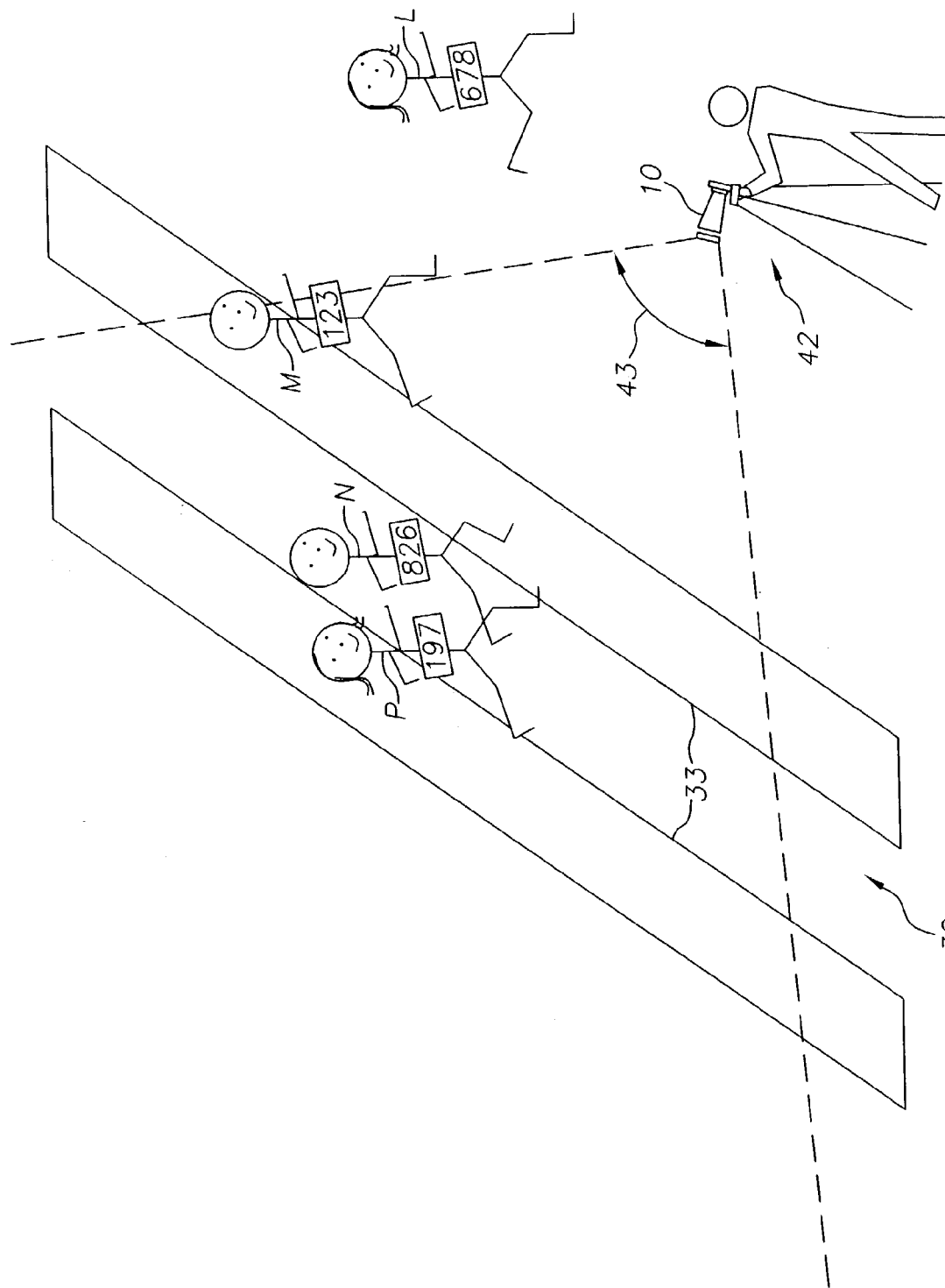
FIG. 5 is a pictorial illustration of a foot race, where the photographed contestant has passed the timing mat.

Referring now to FIGS. 3–5, a critical problem occurs when capturing multiple sequential images of multiple contestants. First consider the case of a single contestant M in a sequential line of contestants, as initially shown in FIG. 3: As the particular contestant M approaches the photographic station 42, images are being captured of contestants K & L that have crossed the timing location 32 ahead of contestant M. As contestants K & L pass the photographic station 42, information from the timing mats 33 and from contestant K & L's tag articles is obtained and stored in the race time database 40. This information includes TID, time, location and other data. Because of the field of view 43 of the particular camera 10, these images may also include contestant M, even though contestant M has not yet reached the photographic station 42 or the timing location 32. Consequently, no information regarding contestant M is stored in the race time database 40 at this time. Each captured image is stored with image capture data in the camera image database 44.

Eventually, as shown in FIG. 4, contestant M crosses the timing location 32 and passes the photographic station 42, again within the field of view 43 of the camera 10, and one or more images may be captured as this happens. These images and data are stored as before. As contestant M passes the photographic station 42, information from the timing mats 33 and from contestant M's tag article is obtained and stored in the race time database 40. This information includes TID, time, location and other data. Finally, as shown in FIG. 5, contestant M may continue to be within the field of view 43 and captured in images of contestants (e.g., contestants N & P) that are following contestant M across the timing location 32. As contestants N & P pass the photographic station 42, information from the timing mats 33 and from contestant N & P's tag articles is obtained and stored in the race time database 40. This information includes TID, time, location and other data. As with FIG. 3, no information regarding contestant M is stored in the race time database 40 at this time. The images and image capture data are stored as before.

Figure 6:
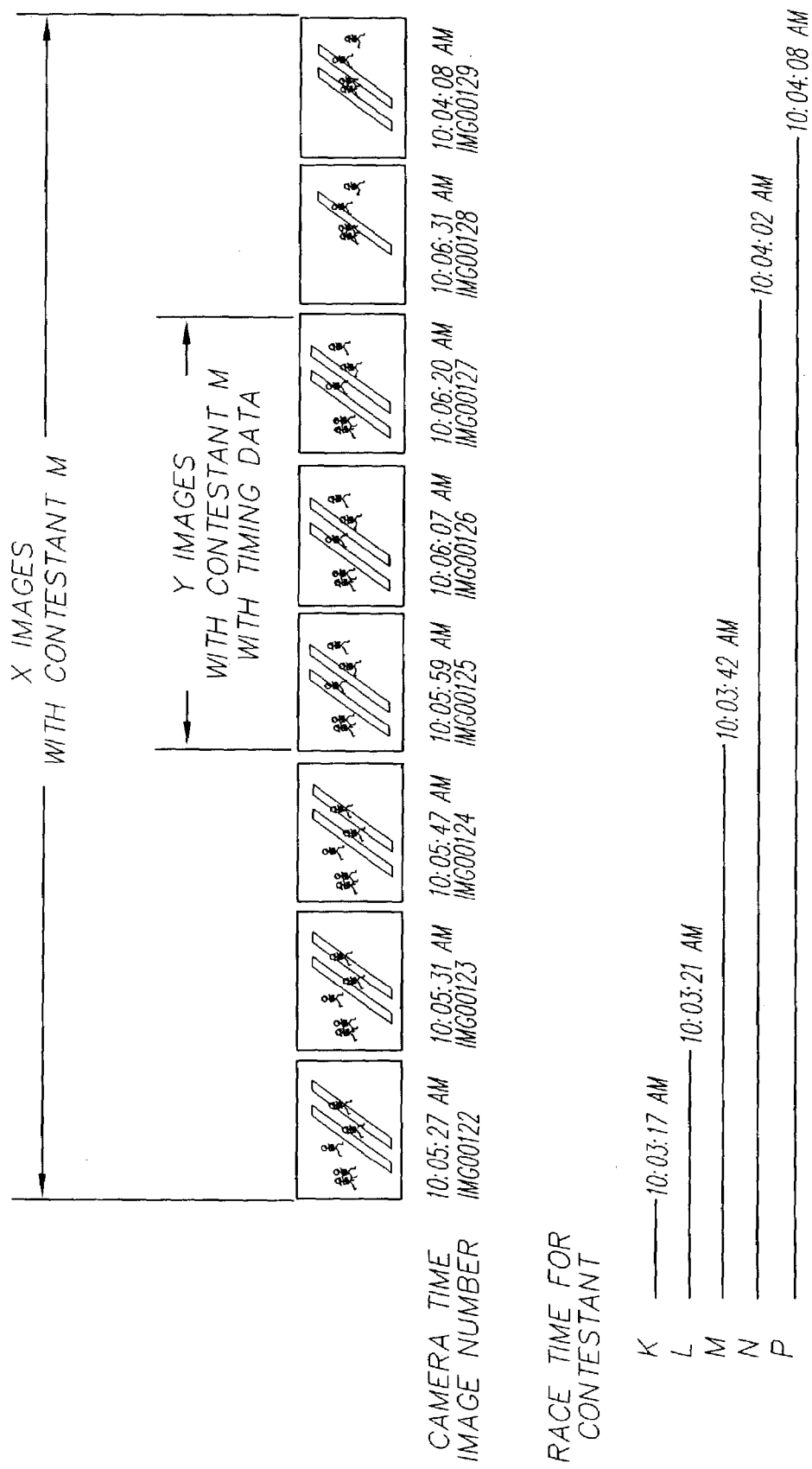
FIG. 6 is a diagram of the asynchronous relationship between image capture and race timing data.

Therefore, as illustrated in FIG. 6, contestant M appears in a group of X images. Some number Y of these X images were taken when contestant M passed the photographic station 42 (as shown in FIG. 4) and the timing location 32, and these Y images may be correlated by time and/or other data with race time data in the race time database 40. However, the other (X-Y) images taken before or after contestant M passes the photographic station 42 (as shown in FIGS. 3 and 5) may not have corresponding race time data obtained from the timing location 32.

Figure 7:
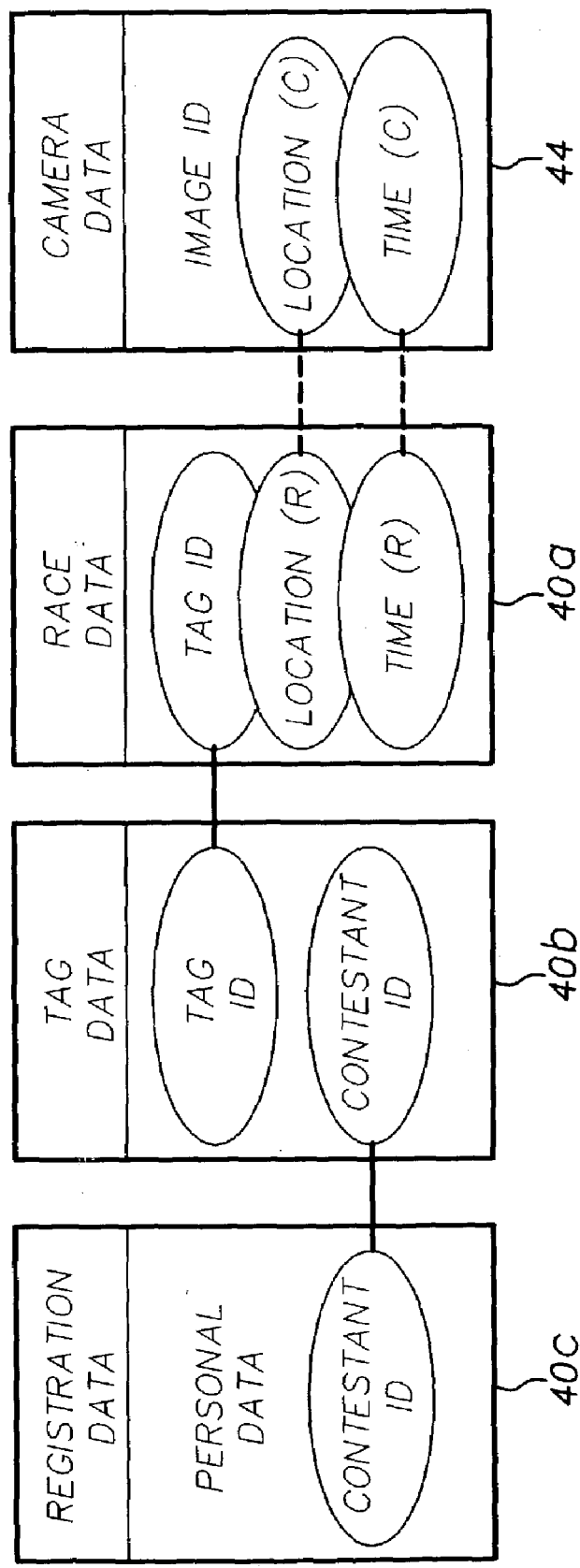
FIG. 7 is a diagram of the various databases used in the race embodiment and their interrelationships.

When the race is finished, data about each contestant is stored in one or more race time databases 40 and one or more camera image databases 44, as shown in FIG. 7. As also shown in FIG. 7, the race data, the tag data and the registration data may be in separate databases 40a, 40b and 40c. Using well known database management techniques to implement the invention, as will be described later in further detail, contestant ID, Tag ID, location and time information (and other information as required) are used in the correlation processor 46 to determine which contestant was in a given photo or image.

After the race, contestant M approaches the photographic order station 48. A unique identifier (such as the CID, TID, contestant name, or any other appropriate unique data in the databases) is provided to an operator, who enters the identifier into a processor (not shown in FIG. 2, but similar to the point of consumer computer 16 shown in FIG. 1) associated with the order station 48 to locate all images of contestant M. The process used to locate, select, display and order products using these images will be described later. Once images are displayed, contestant M can select images and other products, such as souvenir mugs, t-shirts, etc., that can be made with the images. The products are then produced and, after payment is received, delivered to contestant M, either directly at the event or through e-mail, the postal service, or the like.

Before discussing the issues surrounding the correlation of the camera data in the camera image database 44 with the timing and ID data in the race time database 40, it is helpful to review the sources of the technical problems associated with this endeavor.

Time Issues. There are several time errors that must be addressed. These include synchronization, clock speed or rate of time, precision of time measurement, and resolution of measurement. These factors combine to impact the overall accuracy of time measurement.

a) Synchronization—One problem that occurs is that the clocks in the various components of the system are not necessarily synchronized, and thus each clock may report the time at any particular instant as a different value. For instance, the clock in the race data gathering station 34 may indicate the time is exactly 10:00:00 AM and the clock in the camera 10 might indicate the time is 10:03:29 AM at exactly the same instant. Synchronization error can be reduced by setting all clocks to a reference, but time drift will occur, and eventually the clocks will no longer be synchronized.

b) Rate—Each clock will operate at a slightly different rate or frequency, and thus one minute on a first clock may not measure the same as reported on a second clock. Thus elapsed time errors accumulate after synchronization.

c) Precision and Resolution—Race timers typically measure time in fractions of a second (e.g. HH.MM.SS.xx) while camera clocks typically measure time to the nearest second (e.g. HH.MM.SS). Thus the resolution of a camera clock is typically ±0.5 second, while the resolution of a race timer may be 100 or more times better than the camera clock data.

These timing issues combine to make the use of time data in the various databases only a relative index method and not an absolutely accurate way of locating an image. Therefore the method or algorithm used to correlate data in the various databases must be flexible when using time data.

Location Issues. The location information in a database is rarely absolute and accurate. Several factors affect the accuracy of location information, including actual location of the contestant when the race time measurement is made, position of the contestant when an image is captured, and overlap of the area covered by the race time measurement equipment 33 and the camera field of view 43.

a) Contestant Location for Time Measurement—A contestant's time at a selected location can be measured in a number of ways. One method employs "contactless communications" devices such as a radio frequency identification (RFID) system. (Other contactless communications devices might include optical barcode readers, infrared communicators, magnetic sensors, etc.) RFID systems may be passive (operating from the RF energy from an external RF source) or active (self-powered). The present embodiment uses passive RFID devices, but active devices or other types of devices could also be used.

When an RFID tag is activated by an appropriate RF field, the RFID tag transmits unique data such as a tag number to the receiver 36. A timing mat 33 containing one or more antenna is located on the ground in the race course. As the contestant passes over the mat 33, the RFID tag is activated and the tag number is sensed by the receiver 36 and recorded along with other race data such as location and time in the race time database 40. However, these timing mats are usually activated periodically rather than continuously. Therefore the precise location of the contestant at the time the timing mat is activated and the RFID tag data is acquired will not be the same from contestant to contestant, resulting in some location error. For the purpose of the race timing this location error is not significant, but it can cause problems in photographic systems.

b) Contestant Location for Image Capture—Image capture is done asynchronously with respect to the race timing. This means a contestant could appear in several images, at a different position in each image, and none of these images and positions will exactly correspond to when the race timing data was recorded for that particular race location. (Although, as explained earlier, in some embodiments the camera(s) could be triggered automatically, e.g., off the same RFID signal as the race timing equipment, the separate data captures are still asynchronous because the RFID signal references separate and different timing equipment for race data and photographic data, respectively.)

c) Overlap of Timing Equipment and Field of View—The timing mats are operative over a limited area of the race course, and this mat operational area is usually smaller than the field of view 43 of a camera 10. Additionally, the photographer may change his position from time to time, and the overlap of camera field of view to timing mat operational area can vary.

Another complicating issue is the number of contestants that might be in any image, and the speed with which the images must be captured. As the number of contestants grows in a race, the contestants will naturally spread out forming "lanes" with respect to the arrangement of the timing mats, i.e., the contestant data electronically separates into "lanes" based on the arrangement of the timing mats, where each lane will correspond to one or more timing mats. Ideally there will be one camera for each lane-mat combination, but it is possible that one camera may cover multiple lane-mat locations.

These location issues combine to make the use of location data in the various databases only a relative index method and not an absolutely accurate way of selecting an image. Therefore the method or algorithm used to correlate data in the various databases must also be flexible when using location data.

Image Capture Rate. It is possible that a large race can have many contestants at any given point in the race, say for example eighty (or many more) contestants cross a given timing mat 33 in a short interval, e.g., ranging from fractions of a second to longer intervals such as several minutes. This can be one contestant every (small) fraction of a second. Moreover, this number could be much higher at the start of a race, when the contestants are very close together, and when hundreds may cross a given timing mat in a very short interval.

Multiple Images. Once a group of images has been selected by location and time data, the contestant may appear in multiple images. (See FIG. 6.) It would then be necessary to decide which of the X images of contestant M should be selected for display. X could be significantly larger than Y, depending on the speed at which images are captured, and it may be impractical to display all X images of contestant M. Thus, the method or algorithm used to select Z images for display must be adaptable and may vary for each photographic station's location (e.g. images Z', Z", . . . for locations L', L", . . . ).

The following section describes a preferred embodiment of the instant invention. Other configurations and alternative methods and embodiments are equally feasible.

Figure 8:
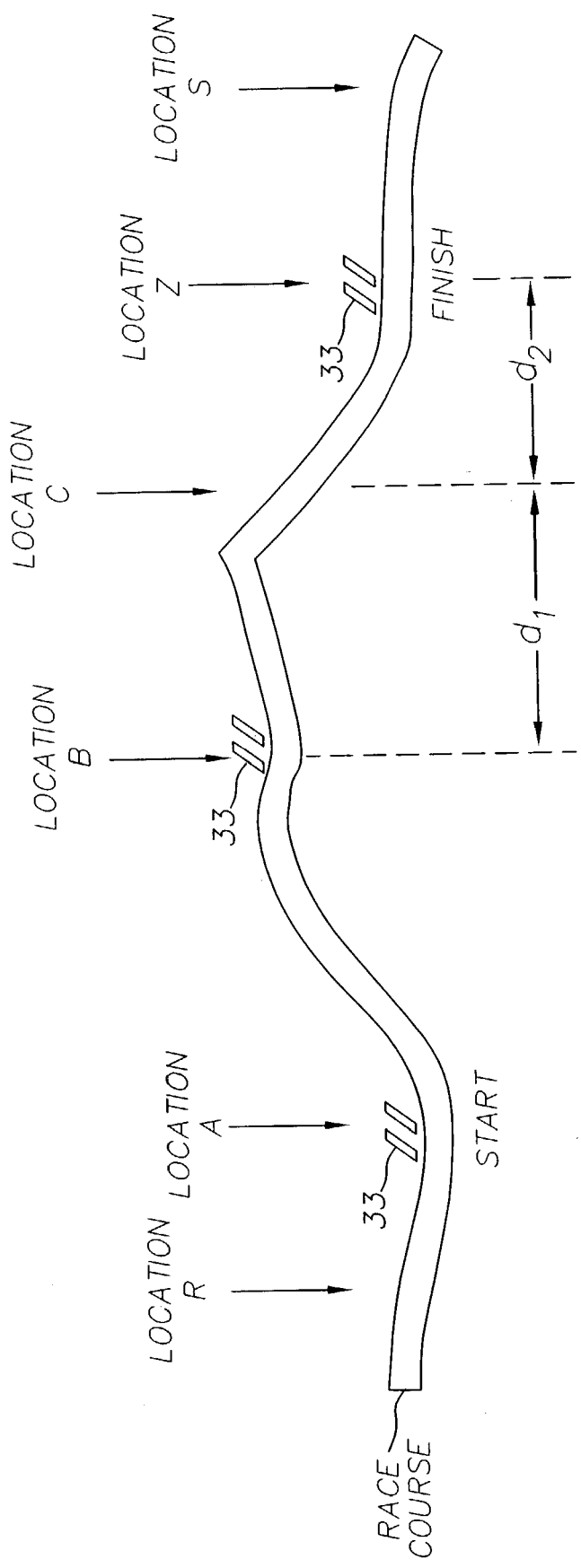
FIG. 8 is a diagram of a race course showing locations for race timing equipment.

A race occurs over a race course whose topography is exemplified in FIG. 8. The start of the race is typically identified as location A and the finish line is typically identified as location Z. Race timing equipment 33 is located at locations A and Z, and additional timing equipment 33 may optionally be located at intermediate positions such as locations B and C. For this example, location C does not have timing equipment. In addition, there may be a pre-race location R and a post-race location S where no race timing equipment is provided.

The type of race timing equipment may vary depending on which timing technology is employed. In this example, the timing equipment uses RFID technology, although alternative technologies could also be used. The race timing equipment 33 is laid out on the race course at each location A, B, and Z. Location C does not have race timing equipment in this example.

Figure 9:
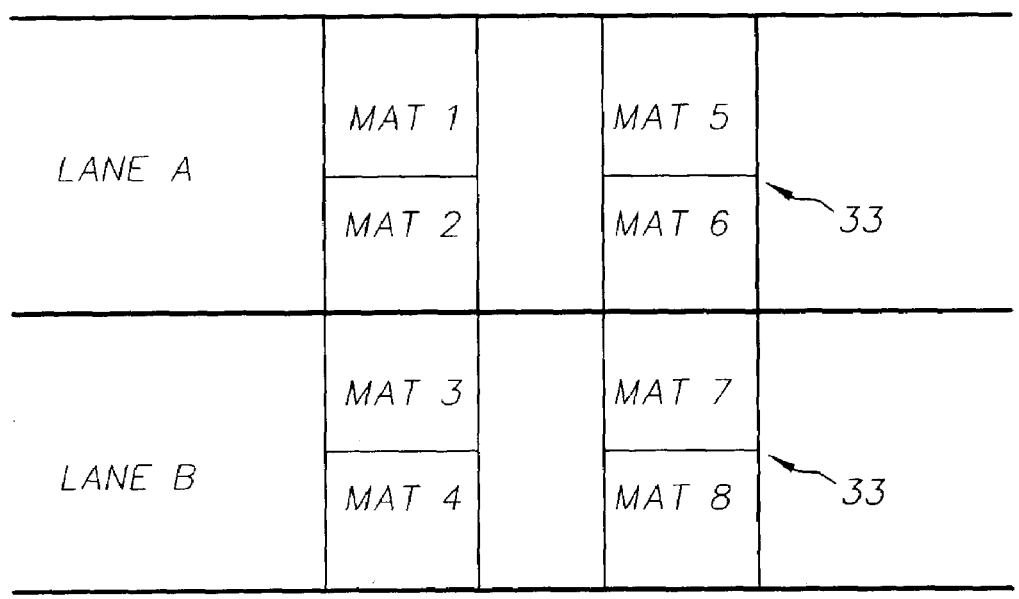
FIG. 9 is a diagram of the layout of race timing equipment for two lanes.

The race timing equipment is positioned on the course in one or more lanes. Referring to FIG. 9, the course comprises two lanes, including a lane A and a lane B. Each lane includes at least one timing mat 33; more specifically, FIG. 9 shows four timing mats in each lane. The timing mats may be arranged in one or more rows Such timing mats include at least one antenna, and typically have two or more antennae. The timing mats are connected to one or more timing controls (not shown) which operate the timing mats. As shown in FIG. 2, the timing mats (via the aforementioned timing controls) are connected to the race data gathering stations 34.

Figure 10:
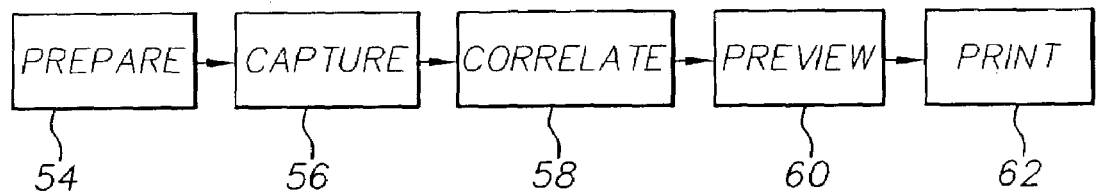
FIG. 10 is a block diagram of the basic functions performed according to the present invention.

FIG. 10 shows the basic functions performed according to the present invention, including a preparation function 54, a capture function 56, a correlation function 58, a preview function 60 and a printing function 62. Each of these functions will now be discussed in greater detail.

Preparation Function

Figure 11:
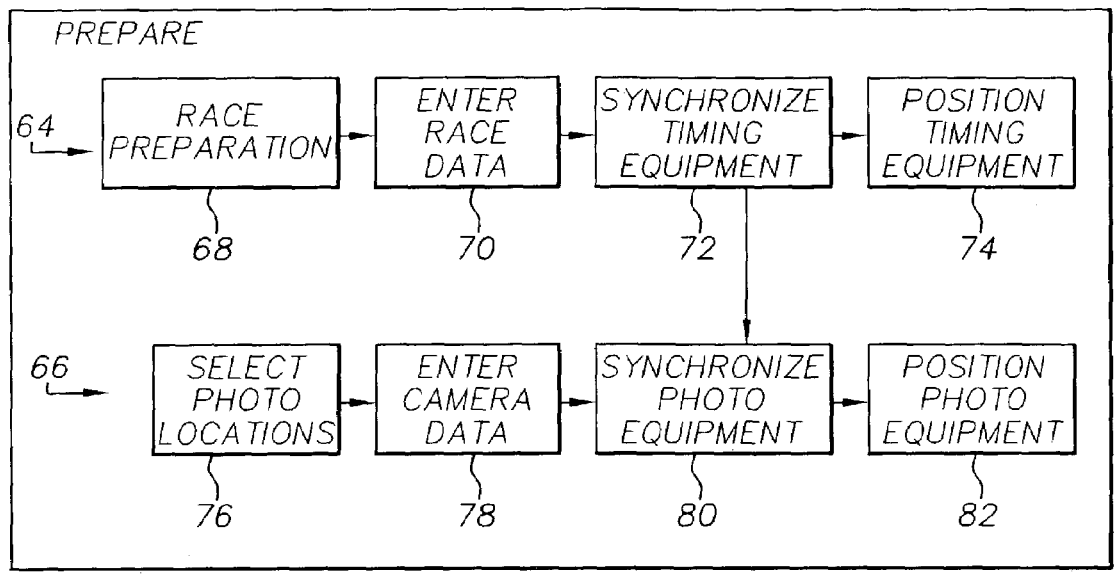
FIG. 11 is a block diagram showing further detail of the preparation function shown in FIG. 10.

The preparation function 54 can occur anytime prior to the start of the race. As shown in FIG. 11, there are generally two parallel activities that occur: race preparation 64 and photography preparation 66.

The race preparation starts with design of the race course and selection of the race timing locations in a race preparation step 68. Appropriate race data is entered into a race database, such as race name, city, state, date, sponsor, timing locations, etc, in a race data entering step 70. The timing equipment 33 is configured and synchronized in a race synchronization step 72, and then it is placed at the selected locations in a race positioning step 74. In the example of FIG. 8, these would be locations A, B and Z.

The photography preparation starts with selection of locations (a photo location step 76) where photographs will be captured. In this example, race locations A, B, C and Z are selected. Additional optional photography locations may be selected, as in this example where pre-race location R and post-race location S are also selected. Appropriate camera data is entered into the camera(s) and/or other photography support components such as computers and databases in a camera data entering step 78. Camera data may include such information as camera ID, event description, date, location, lane, mat number, exposure information, photographer name, etc. The camera(s), and optionally the other photography support components, are then synchronized to the race timing equipment in the photo synchronization step 80. The photo equipment is then positioned at the selected locations and made ready to capture images in a photo equipment positioning step 82.

While synchronization is shown to occur in FIG. 11 during the preparation function, this is not a requirement. Synchronizing can be done anytime right up to the correlation function. Thus, all the data can be gathered without synchronization, and synchronization can thereafter be implemented when the need arises to correlate images with race data.

Photographs can be captured at locations where there is no timing equipment, such as locations C, R or S. Photographs taken at locations C, R or S may be taken "manually" at the will of the photographer, or the taking of the photographs can be "triggered" by auxiliary camera triggering equipment such as a photocell, an independent RFID detector, timers or other method. Photographs at location R can be captured prior to the contestant starting the race, and photographs at location S can be captured after the contestant is finished the race.

Capture Function

Figure 12:
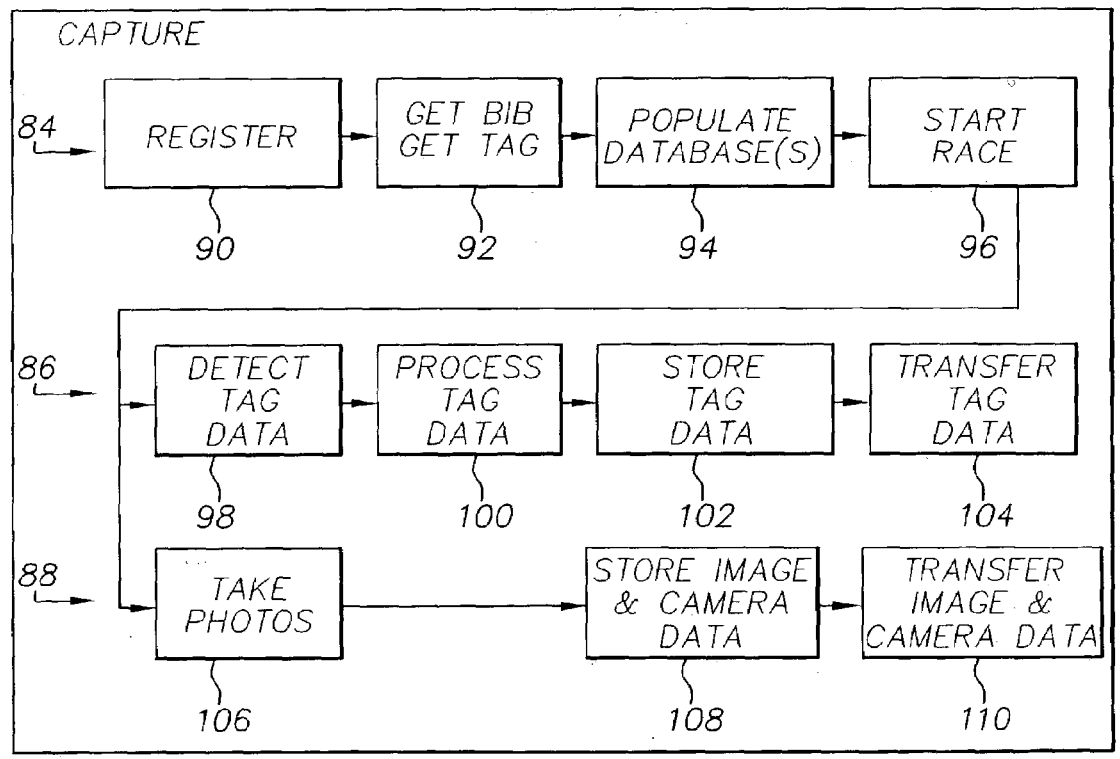
FIG. 12 is a block diagram showing further detail of the capture function shown in FIG. 10.

The capture function 56 begins prior to the start of the race, and continues until all images have been transferred to the camera database 44. As shown in FIG. 12, this function generally consists of three activities: a registration activity 84, a race data gathering activity 86, and an image capturing activity 88.

During the registration activity 84, the contestant registers (in a registration step 90) for the race by providing personal information (and possible fees) to the race operators. Personal information may include name, address, phone number, medical information, emergency contacts, previous race history, organization membership, personal identification number, etc. In a bib and tag supply step 92, the contestant is then provided with a bib having a unique bib identification number, and a tag which includes a unique tag identification number. It is possible that the bib and the tag are combined into a single article. In a database population step 94, the race database 40 is then populated with the personal information, bib ID, tag ID, and any other information of interest to the race operators.

When the race starts (in a starting step 96), the gathering of race data and the capturing of images occur as essentially parallel activities. Race data is gathered whenever a contestant encounters timing equipment 33 at a race location. In a tag detection step 98, the timing equipment 33 detects the tag ID of the contestant. If the tag ID is detected more than once, or if more than one tag ID is detected at the same time, appropriate processing of the tag ID data (in a tag processing step 100) occurs to produce a single dataset for each contestant, where the dataset includes the tag ID, the time the tag ID was detected, the location and other information as necessary. This timing dataset is stored (either locally or remotely in a storage step 102), and may be transferred (as collected, or in a separate transfer step 104) to another (remote) system for correlation with other race and/or camera data.

Photographic data is gathered whenever a photographer captures an image of a contestant (in a capture step 106). The images are stored in a capture data storage step 108, along with appropriate camera data such as image number, camera time, and other information as described earlier. The images and camera data are usually stored locally (i.e. in the camera) using digital or APS technologies, or the like. In alternative embodiments, the image and camera data is stored remotely using common technologies such as a tethered camera or a wireless communication method. The image and camera data is later transferred (in a transfer step 110) to another system (e.g., including the camera database 44 and the correlation processor 46) for correlation with race, tag and/or registration data using known storage and communication technologies such as removable media, tethered or wireless communications, etc.

Photographs can be captured at locations where there is no timing equipment, such as locations C, R or S. Photographs at location R can be captured prior to the contestant starting the race, and photographs at location S can be captured after the contestant has finished the race.

Correlate Function

Once race data and image data are available, a correlation function 58 is implemented in the correlation processor 46 to link related personal, tag, race and image data.

When to Perform correlation—The Correlation function may be performed after the race is finished and all race data and camera data have been input. Alternatively, this function could be performed in an ongoing manner, such as a background operation that operates during the race on all currently available data. Yet another alternative is to perform this function on demand and only on a limited dataset (e.g., for just one contestant at a time). A hybrid approach is possible in which some of the data is automatically correlated in the background (e.g., personal, race and tag data) while other data is correlated on demand (e.g., camera data with all other data). To best illustrate the operation of the correlation function for the preferred embodiment of the invention, it will be assumed that the on-demand approach is employed on a limited dataset, although it is recognized that alternative approaches may be used.

Correlation Method—There are many methods that can be used to correlate data. These methods fall into two broad categories: when all data are known, and when some data is missing. The following table briefly identifies a few of these methods.

| Method # | Category | Scenario | Use |
|---|---|---|---|
| 1 | All data known | Contestant keyed | Using known contestant ID, locate all images of contestant |
| 2 | All data known | Image keyed | Using specific image, identify all contestants |
| 3 | Some data missing | Time interpolation | Estimate time at one location by interpolating the contestant's time at adjacent locations |
| 4 | Some data missing | Associated neighbor | Estimate time and images for one contestant with missing data by associating with another contestant with known data |
| 5 | Some data missing | High speed image scan | High speed display of images to manually identify contestant |

1) Contestant Keyed Correlation—All data are known in this correlation method. The contestant provides some identifying information such as tag ID, bib ID, name or other unique identifier. If the contestant still has the tag article, this tag may be used to obtain the unique identifier (e.g., the RFID device may be read with a reader). The registration, tag and/or race data are searched for all records associated with the contestant using any or all of the available identifiers.

In this embodiment, time and location are used as the primary index fields in the next portion of this correlation method, although other data fields could alternatively be used. See FIG. 13 for an example of how tag ID, race time and location data might appear in the race database 40.

Because the time that images were captured is rarely identical to the time that race data is recorded, it is necessary to consider a range of time when searching for images that are correlated to the race data. (At this stage, the adjusted or synchronized time is stored and available with the images in the camera image database, or is calculated as needed at this point for the correlation function.) This time range is referred to as a "window" that has a target time and a time window size. Note that the target time is not required to be in the center of the time window.

Figure 14:
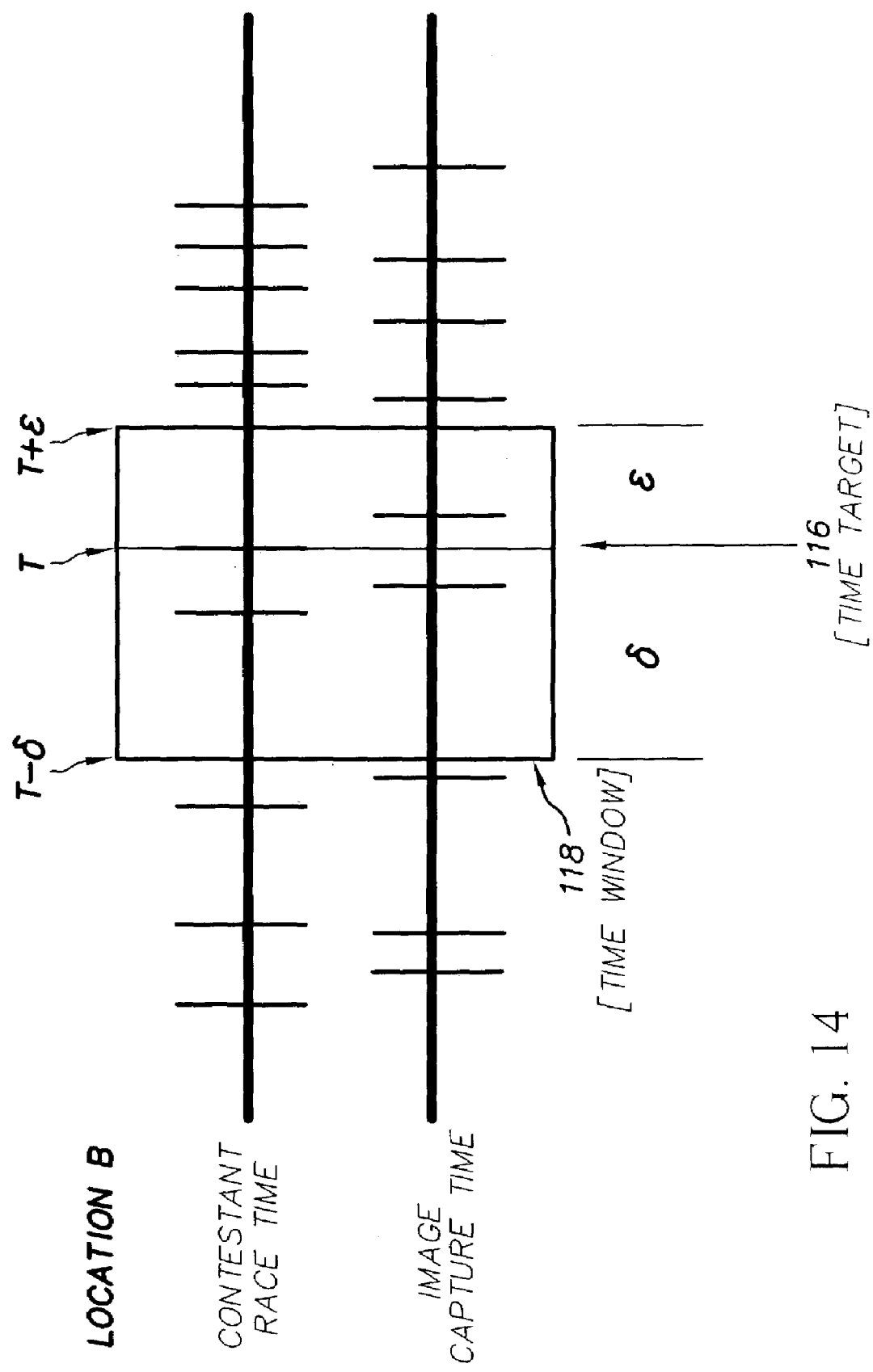
FIG. 14 shows how a time window can be used to relate a contestant race time with image capture time.

FIG. 14 shows how the time window concept relates to race time and capture time data. Using the contestant information, records for that contestant in the race database are located. For the desired location, a target time 116 is set to the race time for the contestant at the desired location. A window 118 having an adjustable time window size (size=$\delta$+$\epsilon$) is defined around the target time. The camera database 44 is then searched for all images taken at the desired location 32 from time (T−$\delta$) to time (T+$\epsilon$).

Figure 15:
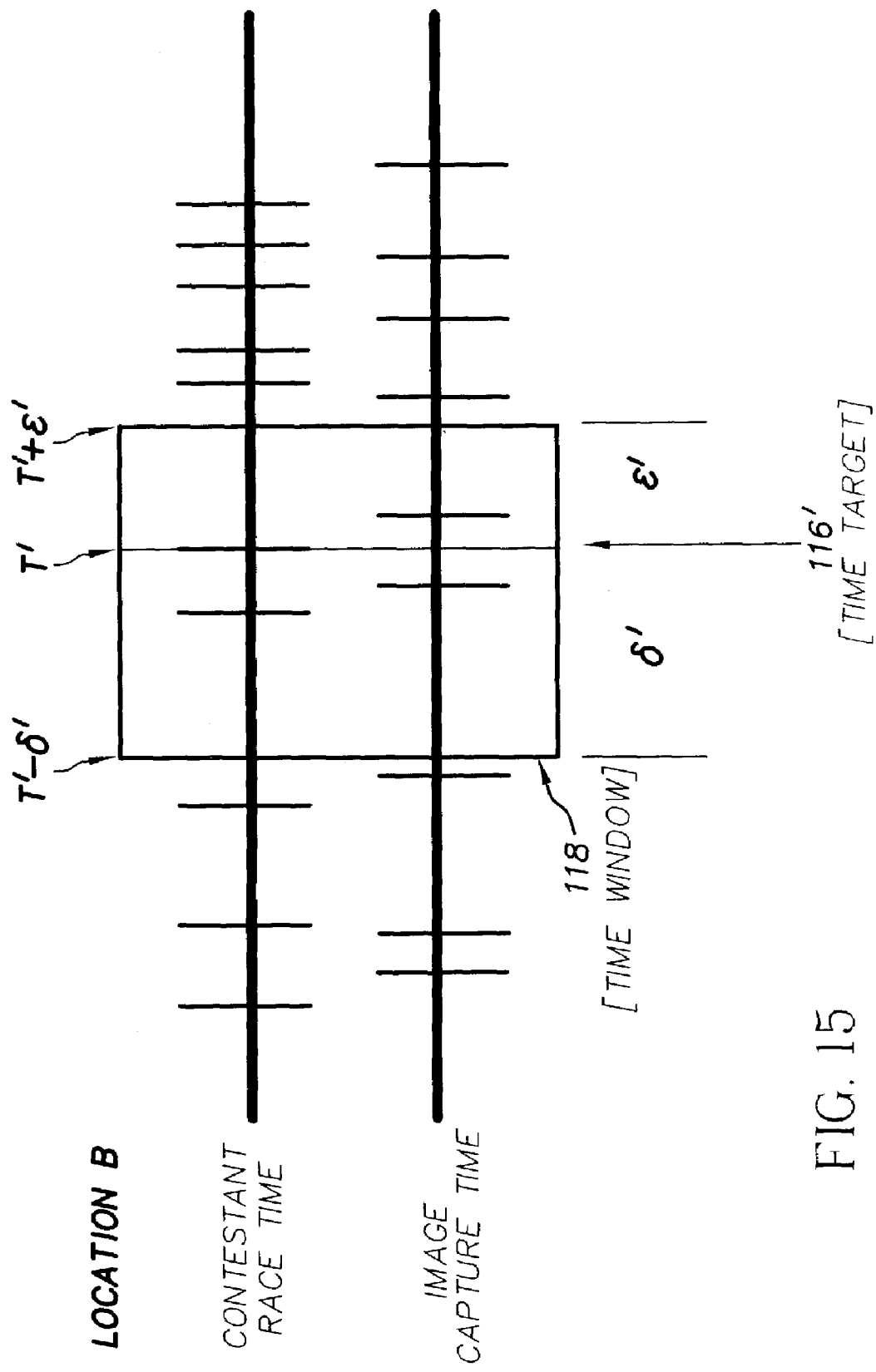
FIG. 15 shows the time window as in FIG. 14 modified for window size.

The preview function could start at this point in the process, or it could begin later. If preview is enabled, the images found in this search are then displayed for review. After reviewing the resulting images, an operator or contestant may decide to modify the search by changing the target time 116, the window size parameters $\delta$ or $\epsilon$, or even the location 32 of the contestant. If any of these values are changed, a new search is performed and the resulting images displayed for review. FIG. 15 shows an example of a modified time window. In this case, the target time 116 may not exactly equal a race time value. In this case, the preview function continues at this point in the process.

2) Image Keyed Correlation—All data are known in this correlation method. In this method, a particular image is selected and the camera time for that image is used to locate a contestant's images.

Figure 13:
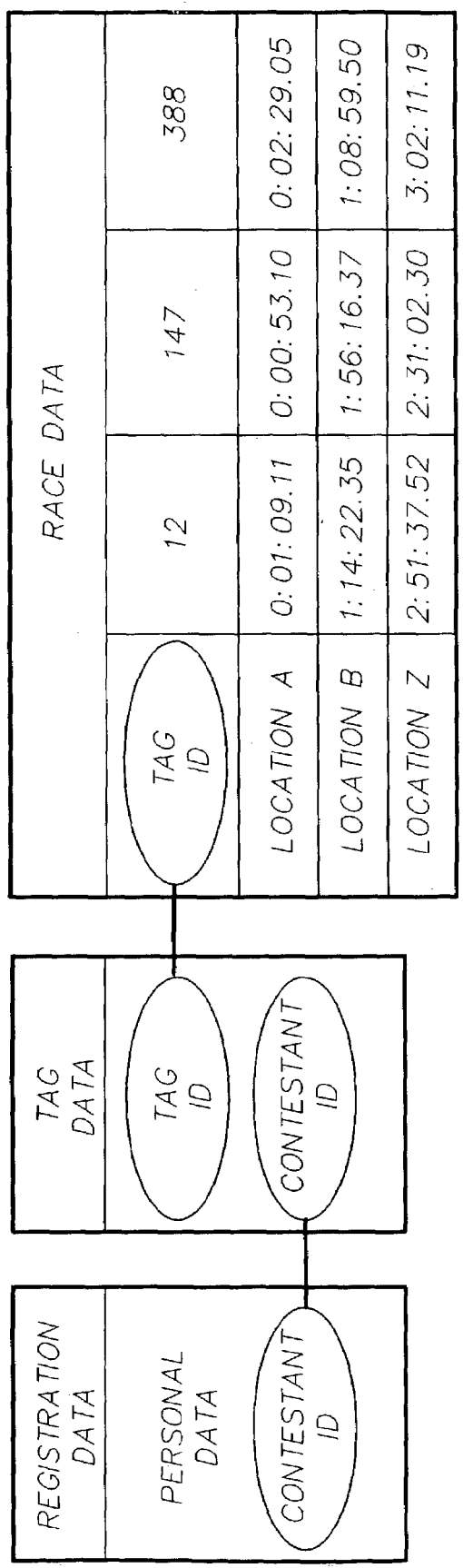
FIG. 13 is an example of how tag ID, race time and location data might appear in the race database.

In this embodiment, time and location are used as the primary index fields in the next portion of this correlation method, although other data fields could alternatively be used. Refer to FIG. 13 for an example of how tag ID, race time and location data might appear in the race database 40.

FIG. 16 shows a portion of the camera database 44. This database includes data such as location, image ID and camera time when the image was captured for each image in the database. There may be many additional fields of data (not shown here) such as photographer, date, a description or annotation, imaging parameters such as lens type, aperture, exposure, etc. Also shown is an optional data field for contestant ID, which may be filled when a contestant ID has been determined by one of these correlation methods, or if, e.g., during the preview function a particular contestant is definitively identified, say by another contestant. The contestant ID field, when filled, is useful for finding the same contestant some time later on without having to repeat the correlation process, or in using a known contestant ID to find another contestant whose ID is unknown, e.g., to find a nearest neighbor (as in correlation method #4).

Figure 17:
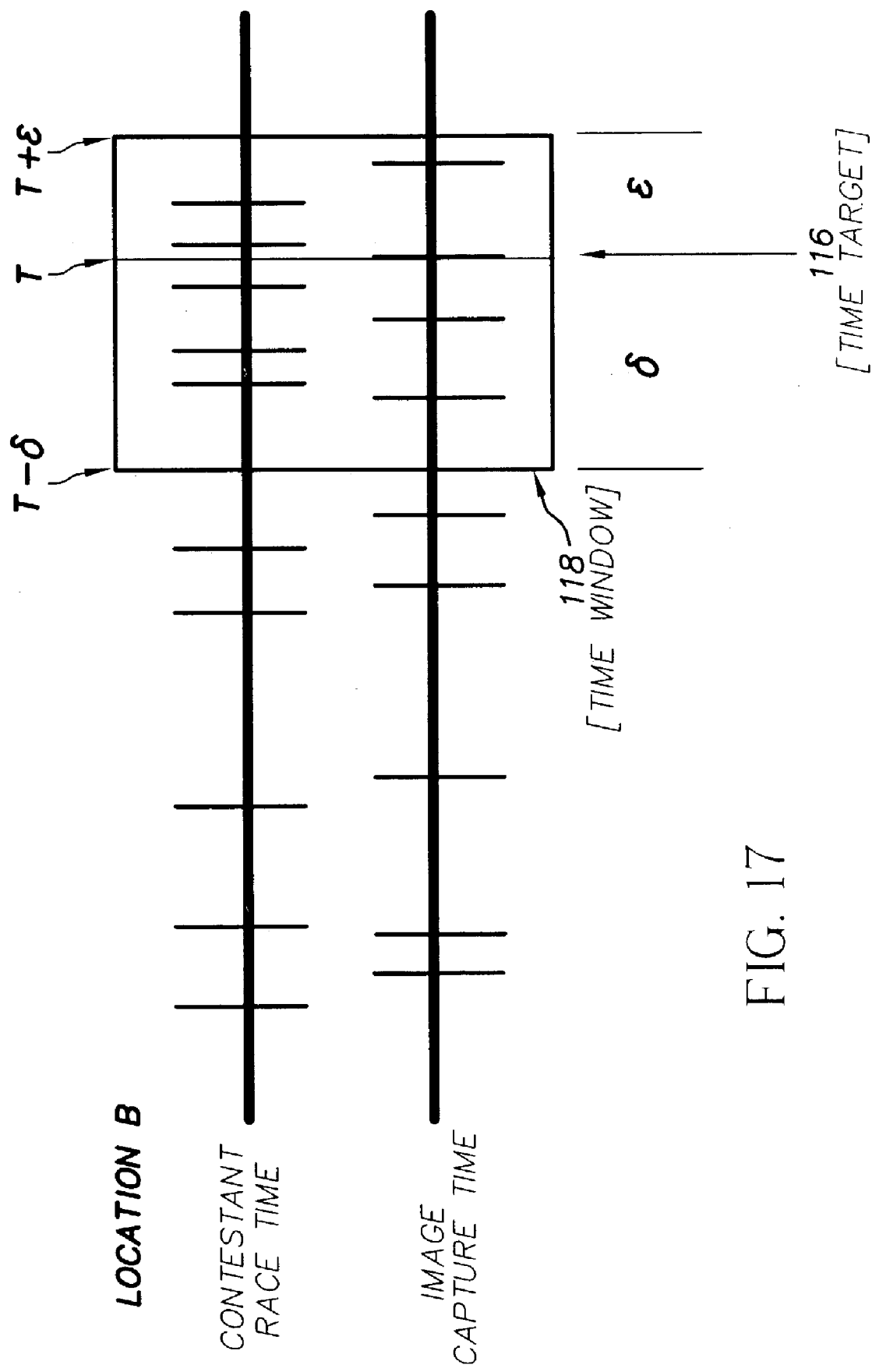
FIG. 17 shows how a time window can be used to relate an image capture time with a contestant race time.

Again it is necessary to consider a range of time, but in this method the search will be for race data that are correlated to an image's camera time. Refer to FIG. 17 for a diagram of how the time window concept relates to race time and capture time data. Using the selected image, the capture time (and optionally other data) are located in the camera database. The target time 116 is set to the image capture time for the selected image. Notice that the difference between FIG. 14 and FIG. 17 is that the target time 116 in FIG. 14 is based on race time data, whereas the target time 116 in FIG. 17 is based on capture time data. As before, a window 118 having an adjustable time window size (size=$\delta$+$\epsilon$) is defined around the target time. The camera database is then searched for all images taken at the desired location from time (T−$\delta$) to time (T+$\epsilon$).

The Preview function could start at this point in the process, or it could begin later. If the preview function is enabled, the images found in this search are then displayed for review. After reviewing the resulting images, an operator or contestant may decide to modify the search by changing the target time 116, the window size parameters $\delta$ or $\epsilon$, or even the location 32 or the contestant. If any of these values are changed, a new search is performed and the resulting images displayed for review. As before, the target time may not exactly equal a race time value.

3) Time Interpolated Correlation—Some data are unknown in this correlation method. In this method one piece of missing information in the database is estimated by interpolation, and the interpolated data is subsequently used to locate the desired images.

Data could be missing in any of the databases, and the interpolation method could be used to estimate the missing values as required.

In this correlation method, time and location are used as the primary index fields in the next portion of this correlation method, although other data fields could alternatively be used. Refer to FIG. 13 for an example of how tag ID, race time and location data might appear in the race database 40.

There are at least two interpolation methods that might be applied. The first interpolation method uses the camera time as the target time, similarly to the Image Keyed Correlation method described previously. The second interpolation method uses an additional field in the camera database, such as a field that records the distance of the photographic location from the start of the race, as an alternative parameter for interpolation.

FIGS. 18A and 18B show portions of the camera database 44 as well as a portion of the race database 40. This camera database may include positional information on the camera location, such as the distance from the starting line. This data is in addition to other data such as location, image ID and camera time when the image was captured for each image in the database. There may be many additional fields of data (not shown here) such as photographer, date, a description or annotation, imaging parameters such as lens type, aperture, exposure, etc. Also shown is an optional data field for contestant ID. This last field may or may not have data in it.

In this example, there is no timing equipment at location C and hence the race database has no time data for that location. The first interpolation method to locate related images is to set the target time to the image capture time in a similar manner to that described in Image Keyed Correlation above. For example, referring to FIG. 8, if the distance $d_1$ of the location C from location B, and the distance $d_2$ of location C from location Z are known, and contestant times at locations B and Z have been recorded, then the target capture time can be matched to the interpolated race time data of the contestants for the untimed location C. A second interpolation method would interpolate using the distance data in the camera database to estimate a camera capture time, and then the estimated camera capture time could be used to locate the desired images in a similar manner to the first interpolation method. This method would be useful if the camera capture time was missing from the database.

4) Associated Neighbor Correlation—Some data are unknown in this correlation method. In this method information for a first contestant is missing from the database and information from a second contestant is used to locate the images of the first contestant.

In this method, a first contestant is missing some or all database information. Information for a second contestant is used to locate the first contestant. Any of the second contestant's identification information may be used, including bib ID, name, etc. All images of the second contestant could be selected and reviewed to see if the first contestant appears in them also. Appropriate images are then selected, or, alternatively, contestants could be selected for additional searching.

5) High Speed Image Scan Correlation—Some data are unknown in this correlation method. In this method no information for a contestant is available in the database and alternative information, such as information for a race buddy, is readily available.

This method selects a sequence of images from a location and displays them in rapid fashion (i.e. like a "movie"). An operator or contestant scans the images for the contestant or an associate. If either are found, the rapid display of images is stopped and the information for the selected image is used to locate other images of the contestant in a similar fashion to the Associated Neighbor Correlation method previously described.

Preview function

Selected images may be displayed to either the operator or the contestant according to the preview function 60 in several ways, as demonstrated by existing EPX systems. These ways may be broadly classified as follows:

| | |
|---|---|
| For Contestant Viewing | Preview monitors similar to existing EPX installations. |
| For Contestant Viewing & For Operator Viewing | POC monitors 16 (see FIG. 1) used by both operator and contestant to view selected images, add optional borders, text or creatives, and select images for output. |
| For Operator Viewing | Backroom operations for marketing, censoring, pre-paid package production, for database management, etc. |

As represented by FIG. 6, during the preview function there may potentially be X images of interest but only a subset (Y images) represent a critical moment during the race, such as contestant M crossing the finish line. Since the target time for the time window used to isolate the images will at least approximately coincide with the timed event, i.e., crossing the finish line, the preview function may be designed to automatically feature those images (Y images) first, and produce the other (X-Y) images secondarily. There are many variations on this theme that would be apparent to one of skill in this sort of endeavor, such as featuring the contestant at the exact moment of crossing the finish line first, then the frame just before and just after, and so on.

The preview functions could be based on existing EPX systems, or new a user interface (UI) could be created. For purposes of this document, it is assumed the EPX system will be used with appropriate screen modifications. The preview function can be implemented on-site, i.e., on or near the race venue, or at some other location, e.g., the home of the contestant or anyone else (e.g., a family member unable to attend the race) interested in the race. In either case, the viewer could enter an access code, which could be the CID or TID identifiers assigned to the contestant, to view the pictures.

Printing Function

Once the images are selected and edited, orders can be placed at the printing function 62 for a variety of products (print, CD, floppy, t-shirt, mug, etc., as well as packages of products). The printing function can be initiated on-site, i.e., on or near the race venue, or at some other location, e.g., the home of the contestant or anyone else (e.g., a family member unable to attend the race) interested in the race. In either case, the viewer could enter an access code, which could be the CID or TID identifiers assigned to the contestant, to view the pictures and order copies of selected pictures or other products. More specifically, images and/or product orders may be uploaded to the Internet for remote viewing, storage or product production. Furthermore, product production can be carried out at typical photofinishing fulfillment centers, which may be on-line or available through other means.

Completed products are then delivered to the contestant (customer). Other types of products could also be delivered, including albums or storybooks, PictureCDs with contestant images and event content combined, publicity documents and news articles, etc.

The invention has been described with reference to a preferred embodiment. However, it will be appreciated that variations and modifications can be effected by a person of ordinary skill in the art without departing from the scope of the invention. For example, while the preferred embodiment shows use of the invention in relation to many timed events connected with a single foot race, the timed events could be separated significantly in time, even days, weeks or years apart. For instance, the timed events could constitute several separate races, e.g., several qualifying races spread over several months and a final race. Furthermore, the technique of the invention can be employed in any situation where timing data may be associated with an event, even though the events have nothing to do with a race. For example, in a graduation ceremony, the graduates may be issued RFID tags that uniquely identify each graduate, then pass over a timing mat at a given location(s), e.g., after receiving their diplomas, where photos are taken. The times of the photos may then be correlated with the timed events according to the invention to identify the graduates in the photos.

PARTS LIST 10 camera(s)
12a storage media
12b tethered link
14 download computer
16 point of consumer computer
18 print server
20 printer
22 poster printer
24 network switch
30 timed event
32 timing locations (32a, 32b, 32c)
34 race data gathering stations (34a, 34b, 34c)
35 control unit
36 receiver
38 local processor
40 race time database
42 photographic stations (42a, 42b, 42c, 42d)
43 field of view 44 camera image database
46 correlation processor
48 photo order station
54 preparation function
56 capture function
58 correlation function
60 preview function
62 printing function
64 race preparation
66 photography preparation
68 race preparation step
70 race data entering step
72 race synchronization step
74 race positioning step
76 photo location step
78 camera data entering step
80 photo synchronization step
82 photo equipment positioning step
84 registration activity
86 race data gathering activity
88 image capturing activity
90 registration step
92 bib and tag supply step
94 database population step
96 starting step
98 tag detection step
100 tag processing step
102 storage step
104 transfer step
106 capture step
108 capture data storage stage
110 transfer step
116 target time
118 time window

What is claimed is:

1. A method for correlating asynchronously captured event data associated with a timed activity and images associated with the events, said method comprising the steps of:
  (a) capturing a plurality of images;
  (a$_1$) assigning a timestamp at time of capture to each image;
  (a$_2$) storing images and the assigned timestamp in a first database;
  (b) gathering time data and identifying data from a timed activity for a specific occurrence within the timed activity and storing the identifying data and the time data, in a second database, wherein the time data for the timed activity is independent of the timestamp associated with image capture and stored in the first database; and
  (c) correlating the images and the identifying data in the first and second databases by choosing an image from the first database and generating a time-based window that interrelates that image to identifying data in the second database that are within the same time-based window as the chosen image.

2. The method as claimed in claim 1 wherein the time-based window comprises a target time and a window size.

3. The method as claimed in claim 2 wherein the target time corresponds to the time of occurrence of an event and wherein step (c) comprises aligning the target time with the time of occurrence of an event in the second database such that any images within the window in the first database are correlated with the event.

4. The method as claimed in claim 3 further comprising the step of previewing the images within the window and adjusting the size of the window so that it encompasses a different group of images.

5. The method as claimed in claim 2 wherein the target time corresponds to the time of image capture of an image and wherein step (c) comprises aligning the target time with an image in the first database such that any events within the window in the second database are correlated with the images.

6. The method as claimed in claim 5 further comprising the step of previewing the images within the window and adjusting the size of the window so that it encompasses a different group of events.

7. The method as claimed in claim 1 wherein the identifying data includes an identifier for a person appearing in an image and wherein step (c) further comprises correlating the images and the identifying data to identify one or more of the persons appearing in the images.

8. The method as claimed in claim 7 wherein the identifier for a person appearing in an image is used to identify another person appearing in the image for whom there is insufficient data in the databases to enable correlation.

9. The method as claimed in claim 7 wherein the timed activity is a foot race and the identifying data includes the identifiers for one or more race contestants appearing in an image and wherein step (c) further comprises correlating the images and the identifying data to identify one or more of the contestants appearing in the images.

10. The method as claimed in claim 1 wherein step (c) further comprises interpolating either the time of image capture of images in the first database or the time of occurrence of events in the second database in order to correlate the images and the images and the identifying data in the databases.

11. The method as claimed in claim 1 wherein the time-based window includes a target time corresponding to the time of occurrence of an event and the method further comprises the step of previewing the images within the window, wherein the preview of the images is ordered according to the closeness of the times of capture of the images to the event.

12. A system for capturing images and correlating asynchronously captured event data associated with a timed activity and images associated with the events, said system comprising:
  a camera system for capturing a plurality of images and recording data corresponding to the images, including a time of image capture for each image as a timestamp;
  an image database for storing the images and the data corresponding to the images;
  a data recording system for recording time data and identifying data from a timed activity for a specific occurrence within the timed activity, wherein the time data is independent of the timestamp, stored in the image database, for each image captured;
  an event database for storing the time data and identifying data; and
  a processor for correlating the images and the identifying data in the image and event databases by choosing an image from the image database and generating a time-based window that interrelates that image to identifying data in the event database that are within the same time-based window as the chosen image.

13. The system as claimed in claim 12 wherein the identifying data includes an identifier for one or more persons in the captured images.

14. The system as claimed in claim 13 wherein the data associated with the plurality of events includes identification of the persons placed in the images and the processor, which correlates the images with the identifying data, also relates the captured images with the identification of the persons in the images.

15. The system as claimed in claim 12 wherein the time-based window utilized by the processor comprises a target time and a window size.

16. The system as claimed in claim 15 wherein the target time corresponds to the time of occurrence of an event and wherein the processor aligns the target time with the time of occurrence of an event in the event database such that any images within the window in the image database are correlated with the event.

17. The system as claimed in claim 16 further comprising a display device for previewing the images within the window, whereby the processor adjusts the size of the window so that it encompasses a different group of events.

18. The system as claimed in claim 15 wherein the target time corresponds to the time of image capture of an image and wherein the processor aligns the target time with an image in the image database such that any events within the window in the event database are correlated with the images.

19. The system as claimed in claim 18 further comprising a display device for previewing the images within the window, whereby the processor adjusts the size of the window so that it encompasses a different group of images.

20. The system as claimed in claim 12 wherein the processor further includes an interpolation algorithm for interpolating either the time of image capture of images in the image database or the time of occurrence of events in the event database in order to correlate the images and the identifying data in the databases.

21. The system as claimed in claim 12 further comprising a display device for previewing the images within the window, wherein the time-based window includes a target time corresponding to the time of occurrence of an event and the display of the images provided by the display device is ordered according to the closeness of the times of capture of the images to the event.

* * * * *

UNITED STATES PATENT AND TRADEMARK OFFICE
CERTIFICATE OF CORRECTION

PATENT NO. : 7,158,689 B2 Page 1 of 1
APPLICATION NO. : 10/303363
DATED : January 2, 2007
INVENTOR(S) : Michael A. Valleriano et al.

It is certified that error appears in the above-identified patent and that said Letters Patent is hereby corrected as shown below:

Column 17, line 50, delete "data," and insert -- data --

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 7,158,689 B2  Page 1 of 1
APPLICATION NO. : 10/303363
DATED : January 2, 2007
INVENTOR(S) : Michael A. Valleriano et al.

It is certified that error appears in the above-identified patent and that said Letters Patent is hereby corrected as shown below:

Column 18, line 34    In Claim 10, before "identifying" delete "images and the"

Signed and Sealed this

Sixteenth Day of October, 2007

JON W. DUDAS
*Director of the United States Patent and Trademark Office*